Aug. 19, 1969   J. SELZ   3,462,558

TELECOMMUNICATIONS AMPLIFICATION CENTER

Filed Aug. 5, 1966   9 Sheets-Sheet 5

United States Patent Office 3,462,558
Patented Aug. 19, 1969

3,462,558
TELECOMMUNICATIONS AMPLIFICATION CENTER
Jacques Selz, Viroflay, France, assignor to CIT—Compagnie Industrielle des Telecommunications, Paris, France
Filed Aug. 5, 1966, Ser. No. 570,537
Claims priority, application France, Aug. 5, 1965, 27,399
Int. Cl. H04q 1/04
U.S. Cl. 179—98   7 Claims

ABSTRACT OF THE DISCLOSURE

A telecommunication amplification system wherein line members, terminating members and operating members are organized in such a way to to save considerable space and reduce installation expenses, wherein the line members and operating members are respectively situated in portions of a vertical frame forming a column with distributors and connecting moduli positioned at the rear of the frame.

---

The present invention relates in general to communications systems and more particularly to a system for grouping of members of an amplification center to save space and installation expenses in relation to the presently known arrangements.

In the prior art, the linkage between the input of a long distance telephone line and desk-side equipment is made by a single system of complex construction which can be adapted, by appropriate internal connections, to different types of use. Such a system is of costly construction, and only a portion of its constituent elements is effectively used at a given time.

Present development in the art has replaced this complex system by the association of two more simple devices a device functionally linked to the line, hereinafter called the line member and a device assuring the adaptation between the line circuits and the terminal circuits hereinafter called the operating member. The principal line members are: (1) single track equipment with one primary group of twelve tracks (the most frequent case) (2) terminal repeater 2 wires/4 wires (3) single vocal frequency signaler (4) double vocal frequency signaler.

Four principal types of operating members can be cited: (1) equipment for the termination of two wire circuits (2) equipment for the retransmission of low frequency signaling (3) equipment for four wire circuits (4) equipment for special circuits (harmonic telegraphy, radio circuit, telephone, etc.).

The association of a line member with an operating member is sufficient to perform all of the operating functions of the system.

The object of the present invention is to define a group structure which can reduce the size of the known installation and the length of the connections thereto, while retaining large operating and line maintenance possibilities.

It is understandable that this object should preoccupy a maker of amplification center equipment. Actually, there is a ceaseless push for a reduction of element dimensions. The introduction of transistors, smaller than tubes, also produced a reduction in dissipation. The dissipation reduction, making possible the use of smaller components and more concentrated circuit elements has already produced a considerable reduction in the size of transistor equipment. To this is most recently added the use of printed circuits. The state of miniaturization will soon go further along this path.

Without even considering the aspect of miniaturization which will be needed in the future, there are already small members whose size continues to diminish. However, the distributor frame is difficult to reduce in size, because its fundamental scale is restricted to the dimensions necessary for ease of accessibility of the equipment: to maintain the possibility of easily effecting the necessary versatile interconnection of the line circuits, it is not possible to reduce the size of the terminal plates associated therewith below a certain limit. The functions of the distribution frame are essential, and it must be admitted that except for a major change in station technique, the frame must be preserved.

The fixed wiring constitutes an encroachment on the volume of equipment rooms which is purely passive and not reducible, for the same reasons stated above, and this encroachment is an extremely heavy burden. The fixed wirings occupy a considerable volume in the cable routes above and below the spans. This is a non-paying load because it corresponds to purely passive identical geometric linkages. There thus results an increasingly greater imbalance between the large linkage elements of constant size which take up a large volume and interconnected members whose size increasingly diminishes with improvements in technology.

This is why the object of the present invention is in part to relieve the amplification center equipment of these burdens by the removal of fixed wirings.

These and other objects, features and advantages will now be described in connection with the following detailed description of the invention, with reference to the accompanying drawing which illustrates one embodiment thereof, and wherein:

Figure 1:
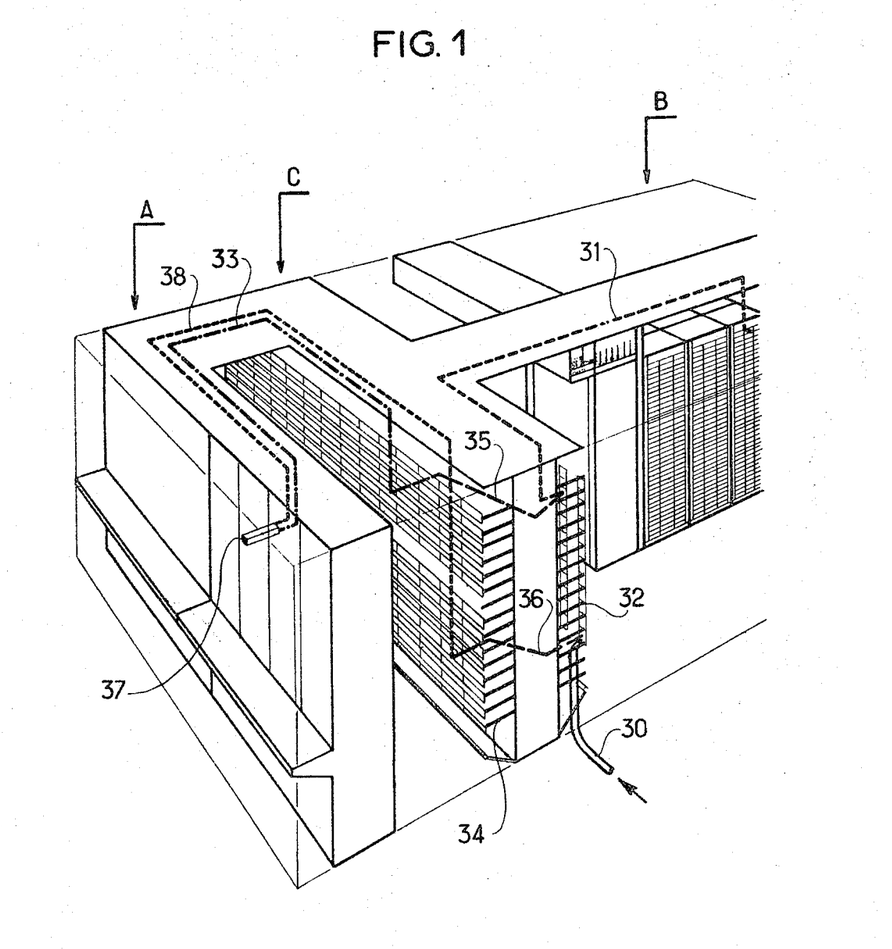
FIGURE 1 is a perspective view of a known installation.

To date, the different members of an amplification center have been joined in blocks, such as represented by FIGURE 1. To obtain good operating flexibility in telephone circuits, the line members have been separated from the operating members and are joined in homogeneous bays, some joining only line members having the same structure (span B of FIGURE 1), the others joining only operating members (span A of FIGURE 1).

In some cases, the operating members are connected to an "operating table" equipped with variable mechanical connecting devices for the supervision and maintenance of the circuits.

The linkage between the spans A and B is made by the following elements: A first fixed wiring 31 going from the line members span B to a first group of terminal plates 32, a second fixed wiring 33 going from the operating members span A to a second group of terminal plates 34, an adjustable wiring comprising jumpers such as 35 and 36 where each connects a pair of contacts of the first group 32 to a pair of contacts of the second group 34. The two groups of terminals 32 and 34 are brought together in a single mechanical structure forming a distribution frame C. The equipped frame C thus comprises the two groups of terminal plates and the interconnecting jumpers. The jumpers give the lattice the desired configuration at any given time by the proper interconnection of the circuits. For reasons of overall efficiency, it is advantageous to orient one group of switches in the vertical sense and the other group of switches in the horizontal sense. The jumpers connect one vertically oriented switch 32 to a horizontally oriented switch 34 through the width of the switch.

The span A comprises operating members such as 37 where the input is connected to the wiring 33. At the output of the operating member, a cable 38 is joined to a terminal of group 34. The latter is connected by means of a jumper 36 to a group 32 terminal which is joined to the cable of line 30.

Figure 2:
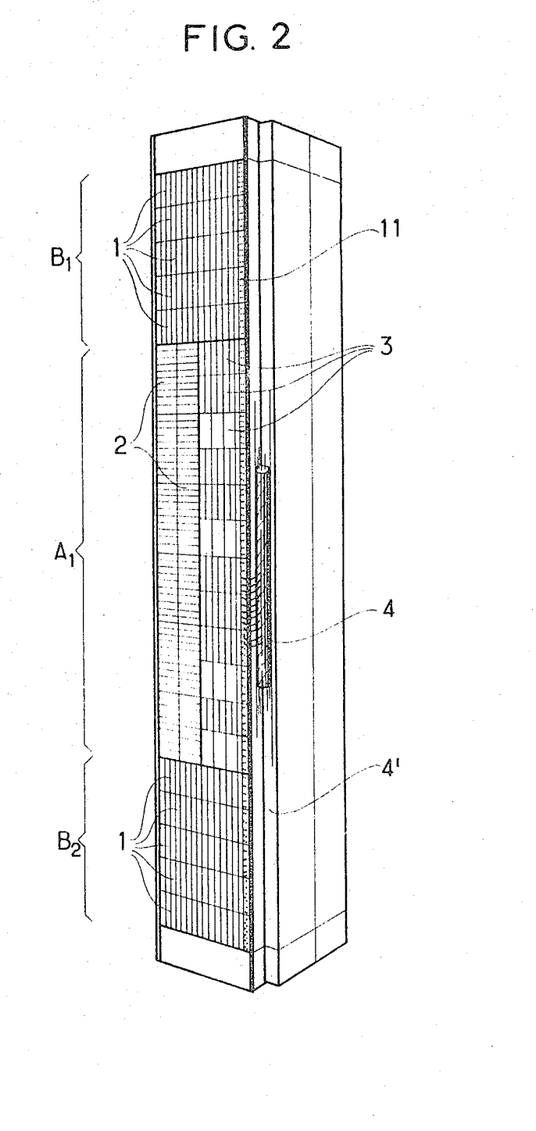
FIGURE 2 is a three quarter front view of a portion of the installation according to the invention.

FIGURE 2 is a three quarter front view of a frame, according to the invention, which supports the line members and the operating members.

This column comprises three sections:
(1) The upper section B1;
(2) The lower section B2 groups the line members designated generally by 1. These line members correspond to the members arranged in the span B of the known installation represented in FIGURE 1; and
(3) The intermediary section A1 groups the operating members and corresponds to the elements contained in the span A of the installation represented in FIGURE 1.

The operating members can be divided into two groups:
(1) The members designated by 2 being the operating members themselves, while the members designated by 3 can be either operating members or general members; and
(2) The operating members generally are small plates and are preferably arranged in two separate columns.

The connection terminal boards designated by 11 are fixed on the right side of the frame. These terminal boards are connected to the conductors of vertical orientation and high frequency cables (such as cable 4) arranged in an intake duct 4'. The terminals of these boards 11 are connected to terminals of members arranged in the frame as will be described in greater detail with reference to FIGURE 6.

Figure 3:
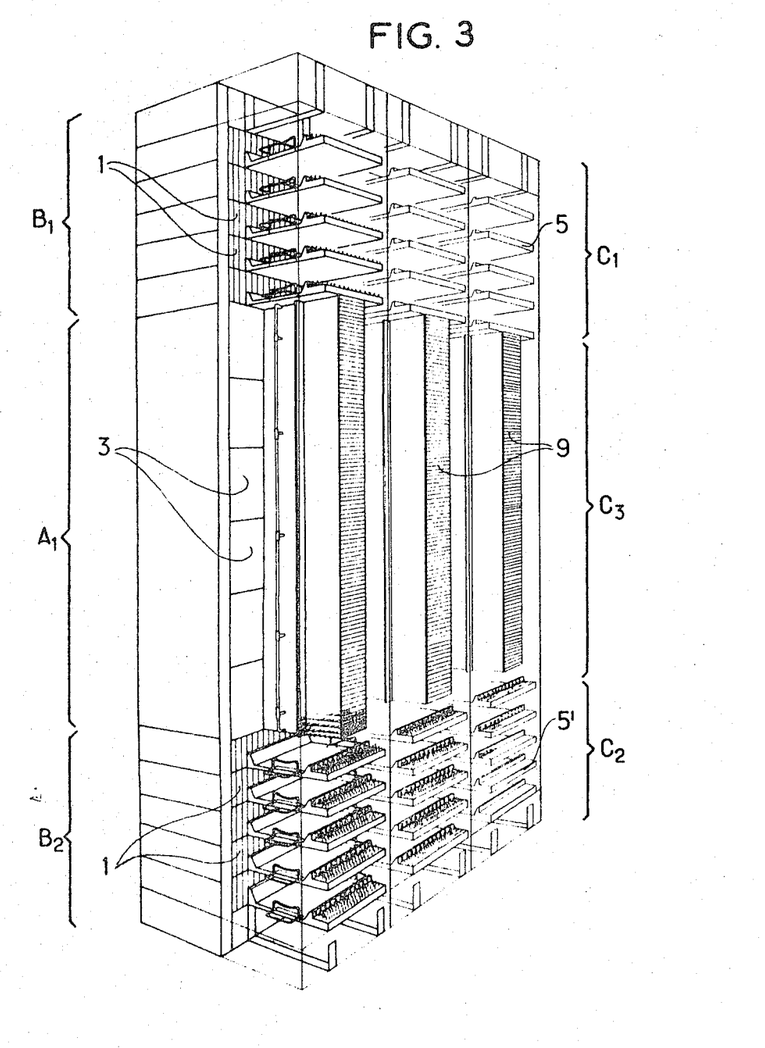
FIGURE 3 is a three quarter back view of an installation according to the invention.

FIGURE 3 is a three quarter back view of a frame represented in FIGURE 2, showing the devices fixed on the back wall of this frame. On FIGURE 3 are represented three frames placed side by side. Each frame corresponds to a column of elements, divided in three sections;
(1) An upper section C1, (2) a lower section C2, and (3) an intermediary section C3.

The sections C1 and C2 correspond respectively to B1 and B2 of the line members, comprising the distributors 5. These distributors 5, which will be described in greater detail with reference to FIGURES 5, 6 and 7, comprise mechanized wirings joined, on one side to terminals in the back wall of the line members and, on the other side to connection terminals, preferably vertically arranged. These terminal bearing distributors form a horizontal combination corresponding to the terminal plates 32 of the line elements in FIGURE 1.

The intermediary section C3 comprises a vertical stacking of connection and maintenance moduli 9 which will be described in detail in reference to FIGURES 8, 9, 10 and 11. The moduli 9 comprise connection lugs or terminals on their lateral walls and form a vertical arrangement corresponding to terminal plates 34 of FIGURE 1.

Figure 4:
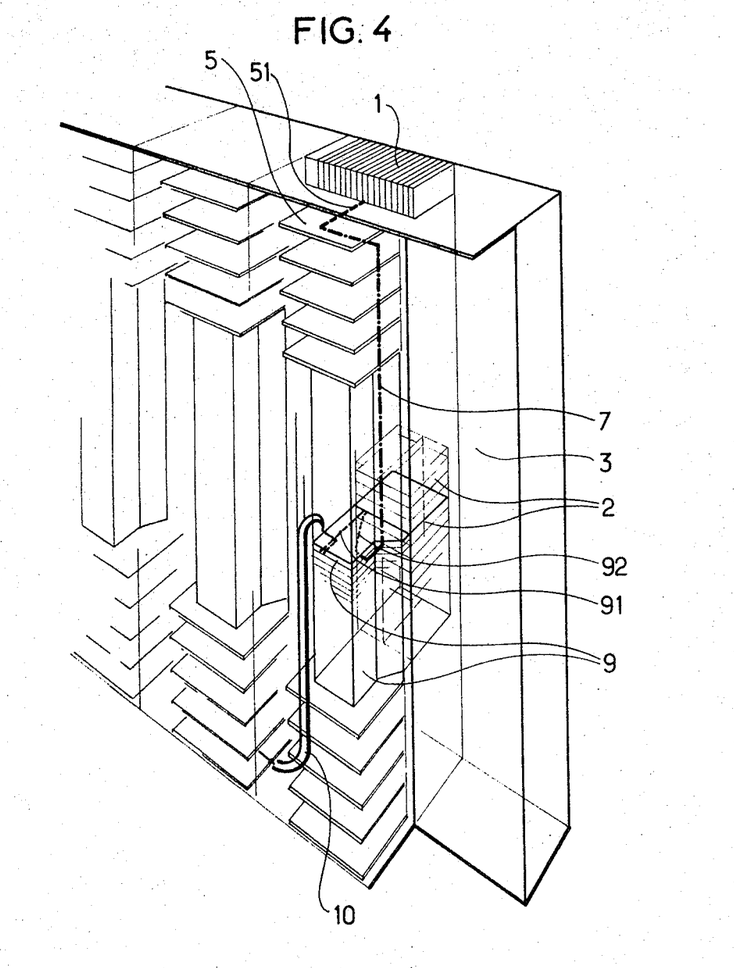
FIGURE 4 is a back schematic view of the installation according to the invention demonstrating the wiring linking the various members.

FIGURE 4 is a more schematized representation of the installation according to the invention. This figure demonstrates the structure of the connections and the economy realized by fixed wiring. In FIGURE 4 is a series of line members 1 each having a terminal joined to a mechanized wiring 51 carried by the distributor 5. This short length mechanized wiring 51 replaces the relatively lengthy wiring 31 of FIGURE 1. Elsewhere, a member 3 has its output and input terminals respectively connected to two mechanized wiring conductors 91 and 92 of a connection and maintenance modulus 9.

One extremity of the mechanized wiring 91 is connected to the conductors of a cable of line 10. This mechanized wiring 91 replaces the jumper 36 and the wiring 38 of FIGURE 1. The other mechanized wiring 92 (corresponding to the wiring 33 of FIGURE 1) is joined to a jumper 7 (corresponding to the jumper 35 of FIGURE 1). The wirings 33 and 38 were replaced by short mechanized wirings 91 and 92 and the jumper 36 is removed. Advantages are thus obtained because of the particular structure of the members of the distributors 4 and the connection and maintenance modulus 9. Other characteristics and advantages contributed by these elements will appear in the detailed description below.

Figure 5:
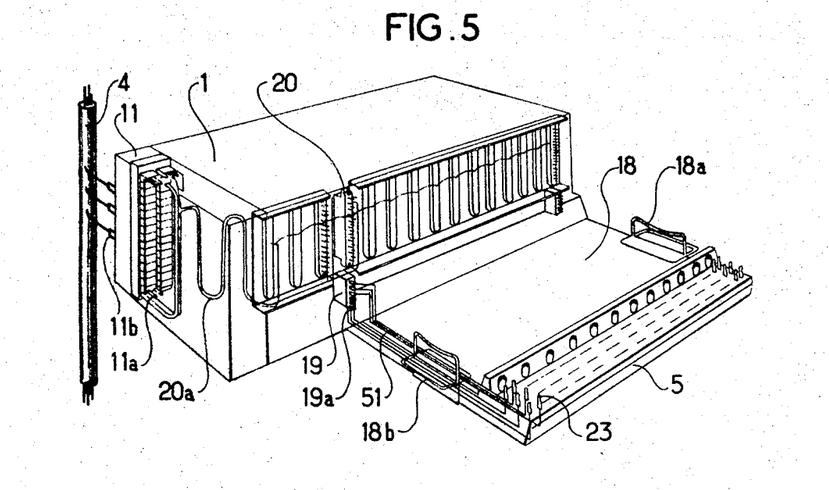
FIGURE 5 is a perspective view of one line member and its distributor carrying connection sockets.
Figure 6:
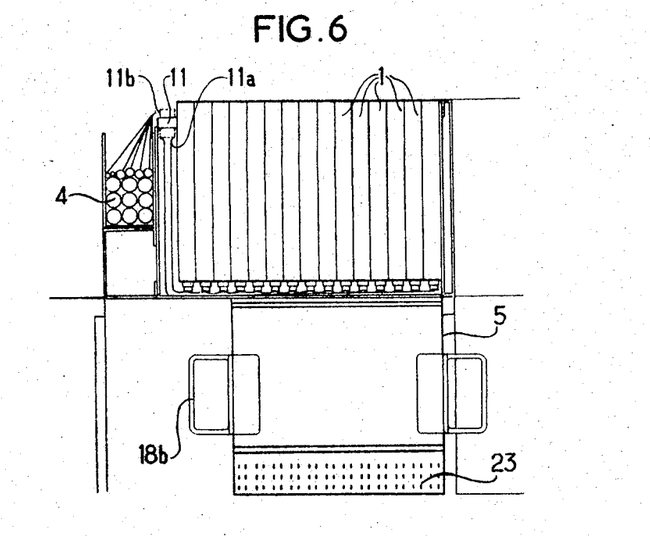
FIGURE 6 is a view from above of the members represented in FIGURE 5.
Figure 7:
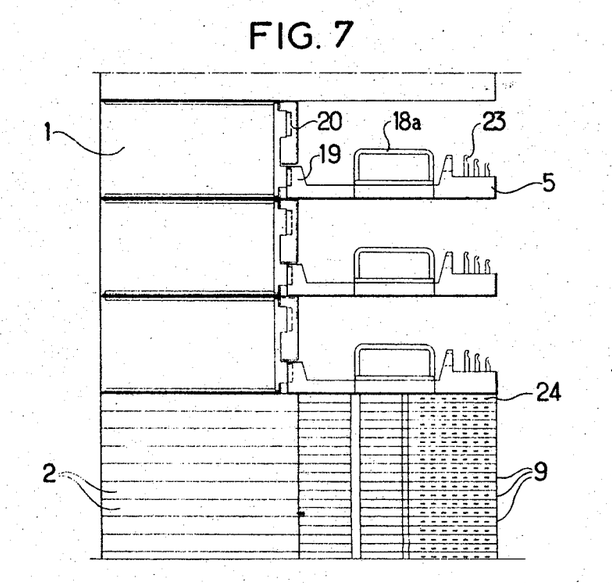
FIGURE 7 is a profile view of the same members.

FIGURES 5, 6, and 7 are respectively a perspective view from above and in profile of the group formed by the sections of line members and the corresponding sections of distributors 5.

In these figures are blocks of line members 1 comprising on their back portion, terminal bearing plates 20 connected by conductors 20a to lugs or terminals 11a of the terminal plates 11. The lugs or terminals 11b in front of the terminal plates 11 are joined to the cable conductors 4 (which are feed cables) and to high frequency current carrier cables. Each line member 1 also comprises a connector 19 whose lugs or terminals 19a are joined to mechanized conductors 51 carried by a distributor 5. These conductors 51 are joined to terminals 23, preferably arranged vertically at the extremity of this distributor 5 so as to form a horizontal corridor 18 for the passage of horizontal jumpers which are kept in position by rings 18a. Elsewhere, rings 18b are placed to hold vertical jumpers, which go from one distributor 5 to another, in position.

FIGURES 8, 9, 10 and 11 illustrate the connection method and the structure of the connection and maintenance moduli generally designated by 9 on FIGURES 3 and 4.

Figure 8:
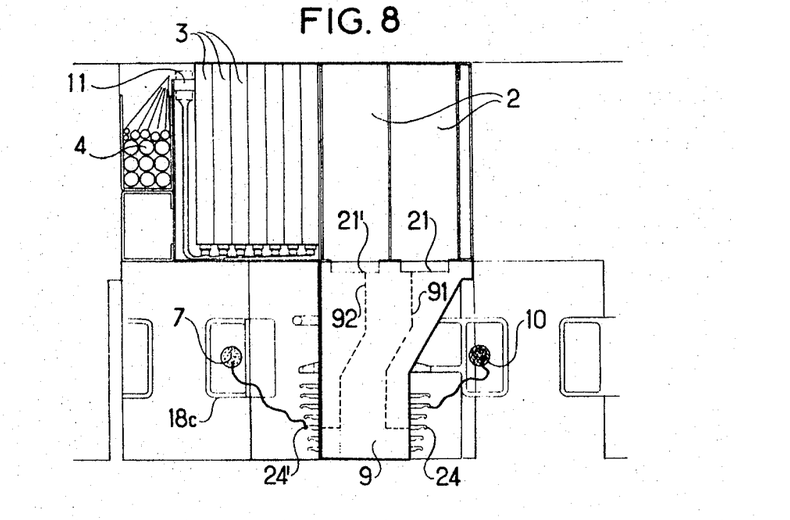
FIGURE 8 is a view from above of the operating members and of the associated connecting modulus.

FIGURE 8 is a view from above analogous to FIGURE 6, showing a horizontal section of the different elements on a line A1–C3 of FIGURE 3. In a general manner, the elements indicated by the reference 2 are operating members in the form of flat horizontal disks, while the elements 3 are general members in the form of flat vertical plates. The operating members 2 have a thickness on the order of 2 cm., while the connection and maintenance moduli 9 have a thickness on the order of 1 cm.

Thus the two members 2 arranged side by side, in a same plane, are associated, with the two moduli 9 placed one above the other, the connection prongs 21 and 21' displaced above. The moduli 9 comprise two series of conductors 91 and 92 respectively joining the series of lugs or terminals 24 and 24' to the input and output terminals of the connector 21 of the line member 2. The terminals 24, for example, are connected to cable conductors of line 10, while the terminals 24' are joined by vertical jumper 7 to the sockets 23 of the distributors 5 associated with the line members. These vertical jumpers 7 are guided by rings 18c forming vertical corridors defined by the rings 18b placed by the distributors 5.

Figure 9:
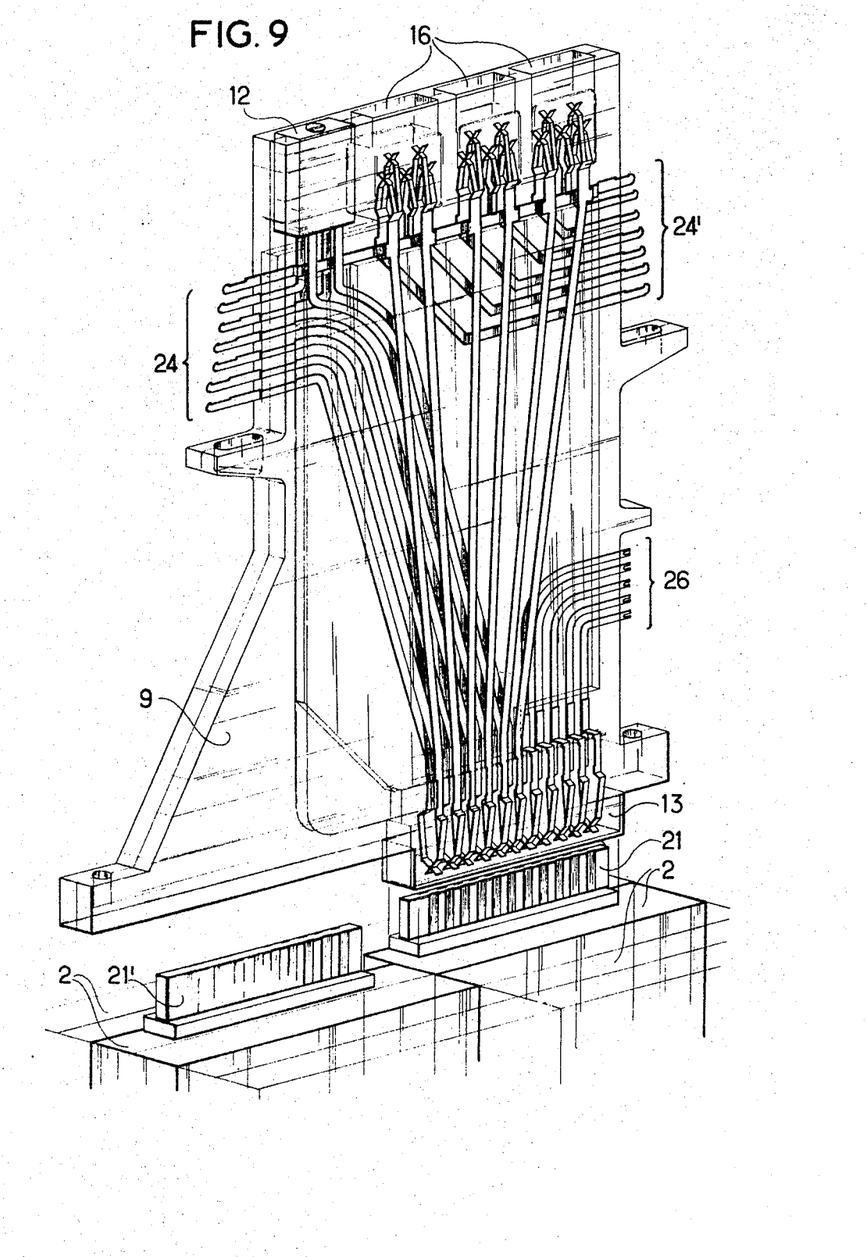
FIGURE 9 is a detailed perspective view of a connection modulus according to the invention.

FIGURE 9 represents structural details of the connection and maintenance moduli 9. These connection and maintenance moduli are generally formed by a mass of insulating material, preferably of synthetic material, in which the mechanized conductors are placed at several levels.

Figure 10:
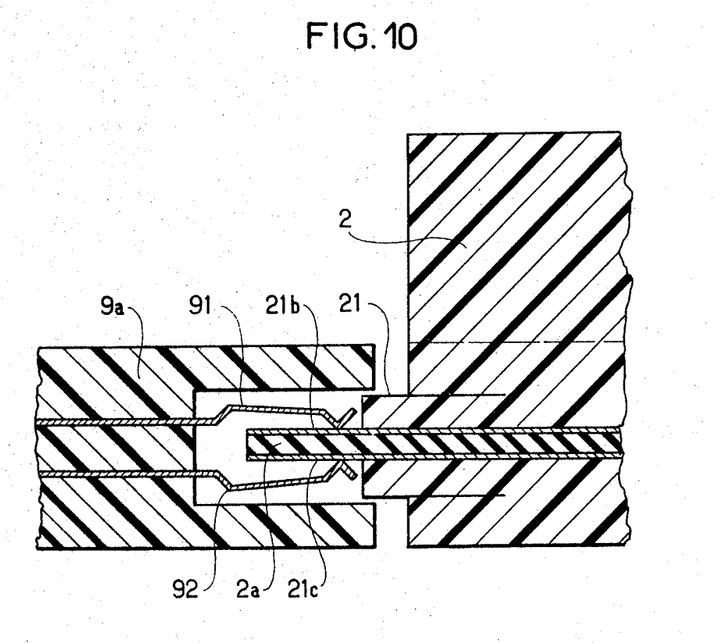
FIGURE 10 is a cross section showing the method of connecting one modulus to a corresponding operating member.

FIGURE 10 represents a section of the extremity 13 of model 9 in FIGURE 9. On this figure can be seen the back of one operating member 2, carrying a contact bearing block 21 comprising insulating plates 2a having conductors 21b–21c on its faces. These conductors 21b–21c operate with contacts on the end of the conductors 91 and 92 immersed in the mass of synthetic material forming the skeleton of the modulus 9. The conductor extremities 91 and 92 form an elastic contact gripper which short circuits the conductors 91 and 92 when the whole of contacts 21b and 21c is removed.

Figure 11:
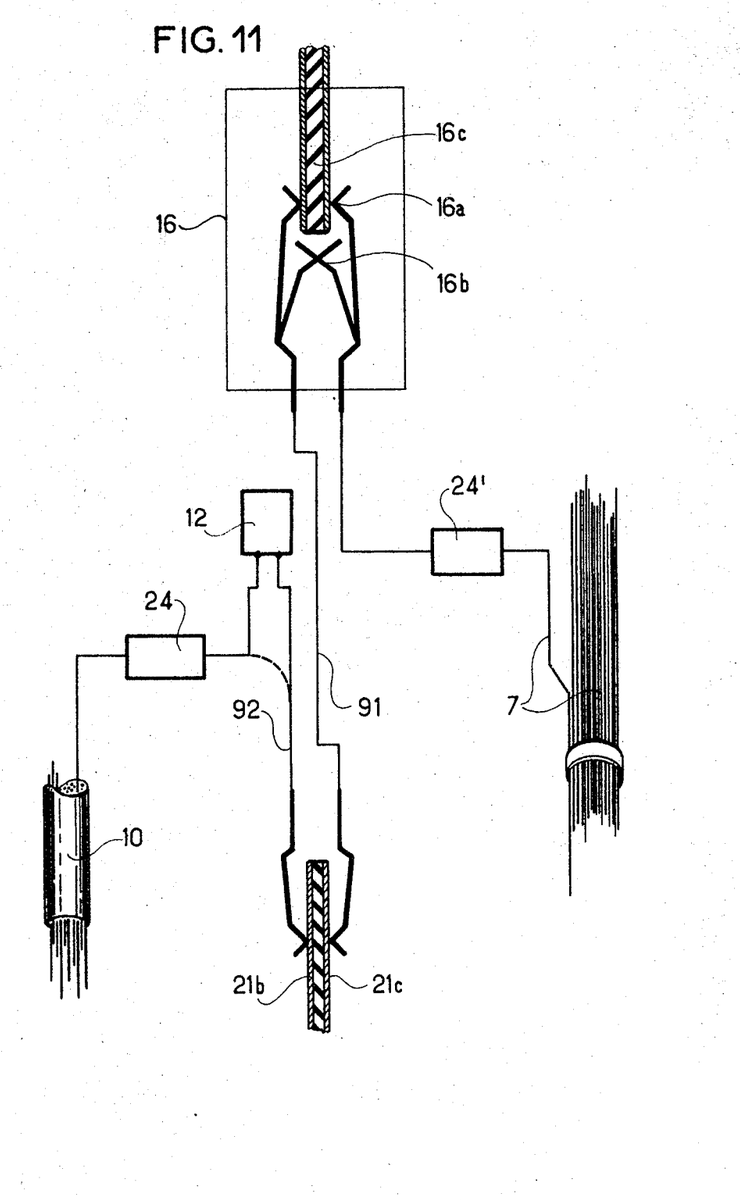
FIGURE 11 is a developed schematic representation of the conductors of one connection modulus.

The contact bearing plate 21 can also comprise plugs of the classical type which are placed in communication with a series of prongs 26 (FIGURE 9) which are destined to be connected, for example, to feed connections. The electrical circuit of the moduli connections 9 is schematically represented in FIGURE 11. The line 10, connected to the socket 24 is joined by the conductor 92 to the contact 21b of the input of an operating member, either directly, or by way of a communication element 12. The output contact of the operating member 21c is joined by the conductor 91, communication element 16, to the lug or terminal 24' which is connected by a jumper 7 to a socket of one of the distributors 5.

The transmitter member 12 can be, for example, a variable reducer formed, for example, by an average zero gain amplifier. The transmitter element 16 is in principle comprised by a plug connector with two positions. In the first position, the plug 16c, only goes into the contacts 16b and can put any current into the circuit. The transmitter elements 16 thus provide for easy maintenance and surveillance of the circuits with or without the interruption of the latter.

The present invention was described with references to a particular structure of the modulus and the maintenance. It must be noted that the moduli can take other forms as a function of the operating needs of the amplification center.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A telecommunication amplification system comprising a plurality of line members functionally joined to the telecommunication line, a plurality of terminal members a plurality of operating members functionally linked to the line members and the terminal members for determining the adaptability of interconnection between respective ones thereof, and distribution frame means for mixing members according to the operating needs of the system, permitting the connection of the terminal members of said telecommunication line to said line member by means of said operating members, in which the said line members and operating members are stacked in a vertical frame forming a column, the said line members being grouped in the sections respectively situated in an upper portion and a lower portion of the said column, the operating members being grouped in an intermediary portion of the said column and the said distribution frame means comprising two pluralities of distributors respectively placed on the rear portion of said vertical frame facing sections grouping the said line members, each of the said distributors comprising fixed conductors joining connection terminals to terminals placed on a rear portion of the said line members, and a plurality of connecting moduli placed behind the frame on a level with the said operating members and each comprising a first series of connection terminals connected by fixed conductors to input terminals placed behind the said operating members and a second series of connection terminals connected by fixed conductors to output terminals placed next to the said input terminals of the operating members, the connection terminals of the first series being joined to the said telecommunication line, the connection terminals of the said second series being connected by jumpers to connection terminals carried by the said distributors placed behind the line members.

2. An amplification center according to claim 1 in which the said connection moduli comprise a means to place at least one of the said fixed conductors in communication with an exterior circuit.

3. An amplification center according to claim 2 in which the said means to place one of the said fixed conductors in communication with a circuit is also capable of disconnecting said fixed conductor from a circuit and to effect the connection of the said exterior circuit thereto.

4. An amplification center according to claim 1 wherein the fixed conductors of said distributors are connected to the terminals placed at the rear portion of said line members by plug-socket type connector means.

5. An amplification center according to claim 1, the connection of the said fixed conductors of the connection moduli with the said input and output terminals of the said operating members is realized by the intermediate of plug-socket type connector means.

6. An amplification center according to claim 1 in which the said operating members have a generally flat form with a thickness substantially twice the thickness of said connection modulus, the said operating members being placed by twos side by side in the horizontal plane and associated with two connection moduli placed one above the other, the input and output terminals of the said operating members placed side by side being displaced in height, the connection of the said input and output terminals with the fixed conductors of the said moduli being laterally offset.

7. An amplification center according to claim 1 in which the connection terminals of the said distributors are placed a certain distance from the bottom of the said line members so that channels are formed for the passage of horizontally placed jumpers.

References Cited

UNITED STATES PATENTS 2,773,940   12/1956   Lebedinsky __________ 179—91
3,214,725   10/1965   De Rose et al. _______ 339—151

KATHLEEN H. CLAFFY, Primary Examiner

J. S. BLACK, Assistant Examiner

U.S. Cl. X.R.

339—158, 174